United States Patent
Dror

(10) Patent No.: US 12,160,309 B1
(45) Date of Patent: Dec. 3, 2024

(54) TIMESTAMPING FOR MULTIPLE SYNCHRONIZATION DOMAINS IN A NETWORK DEVICE

(71) Applicant: Marvell Israel (M.I.S.L) Ltd., Yokneam (IL)

(72) Inventor: Nitzan Dror, Ramot Hashavim (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 17/828,938

(22) Filed: May 31, 2022

Related U.S. Application Data

(60) Provisional application No. 63/194,817, filed on May 28, 2021.

(51) Int. Cl.
*H04J 3/06* (2006.01)
*H04L 7/00* (2006.01)

(52) U.S. Cl.
CPC .......... *H04J 3/0685* (2013.01); *H04L 7/0033* (2013.01)

(58) Field of Classification Search
CPC ........ H04J 3/0661; H04J 3/0685; H04J 3/065; H04L 7/0033; H04L 7/0037; H04L 7/0041; H04L 7/0016; G06F 1/04; G06F 1/06; G06F 1/12
See application file for complete search history.

(56) References Cited

U.S. PATENT DOCUMENTS

| | | |
|---|---|---|
| 8,976,750 B1 | 3/2015 | Pearson et al. |
| 9,356,721 B2 | 5/2016 | Haulin |
| 9,391,728 B2 | 7/2016 | Haulin |
| 9,929,928 B1 | 3/2018 | Dekoos |
| 10,084,559 B1 | 9/2018 | Devineni et al. |
| 2002/0021717 A1 | 2/2002 | Hedayat et al. |

(Continued)

FOREIGN PATENT DOCUMENTS

| | | |
|---|---|---|
| CN | 112887045 A | 6/2021 |
| DE | 102008026391 A1 | 12/2009 |

(Continued)

OTHER PUBLICATIONS

"LAN8814—4-Port Gigabit Ethernet Transceiver with Qsgmii/Q-Usgmii, IEEE 1588, SyncE and TSN Support," Microchip Technology Inc., 108 pages, Feb. 1, 2022.

*Primary Examiner* — Peter Chen

(57) ABSTRACT

A packet processor of a network device receives a packet and a local-domain timestamp generated for the packet at a network interface of the network device based on a local-domain clock maintained by the network device. The packet processor generates a domain-specific timestamp for the packet based on a domain-specific clock maintained by the network device, and determines a delay value using the local-domain clock. The delay value accounts for a time delay experienced by the packet between a time at which the local-domain timestamp was generated at the network interface and a time, according to the local-domain clock, at which the domain-specific timestamp is generated by the packet processor. The packet processor adjusts the domain-specific timestamp based on the delay value to generate an adjusted domain-specific timestamp for the packet, and performs at least one synchronization operation using the adjusted domain-specific timestamp.

20 Claims, 4 Drawing Sheets

(56) References Cited

U.S. PATENT DOCUMENTS

| | | |
|---|---|---|
| 2002/0039370 A1 | 4/2002 | Elliot |
| 2003/0235216 A1 | 12/2003 | Gustin |
| 2004/0008973 A1 | 1/2004 | Marshall et al. |
| 2004/0141526 A1 | 7/2004 | Balasubramanian et al. |
| 2005/0286507 A1 | 12/2005 | Oesterling et al. |
| 2006/0164902 A1 | 7/2006 | Fung |
| 2007/0260906 A1 | 11/2007 | Corredoura |
| 2008/0273521 A1 | 11/2008 | Shao et al. |
| 2009/0310729 A1 | 12/2009 | Liu et al. |
| 2010/0162265 A1 | 6/2010 | Heddes |
| 2010/0223399 A1 | 9/2010 | Kim et al. |
| 2011/0228768 A1 | 9/2011 | Gelter et al. |
| 2012/0014377 A1 | 1/2012 | Joergensen et al. |
| 2013/0003757 A1 | 1/2013 | Boatright et al. |
| 2013/0208735 A1 | 8/2013 | Mizrahi et al. |
| 2013/0343409 A1 | 12/2013 | Haulin |
| 2014/0092918 A1 | 4/2014 | Jost |
| 2014/0153588 A1 | 6/2014 | Haulin |
| 2015/0333856 A1* | 11/2015 | Hayter ................. H04M 7/006 370/328 |
| 2016/0142329 A1* | 5/2016 | Sasak .................... H04L 47/283 370/413 |
| 2016/0294536 A1* | 10/2016 | Biederman ........... H04L 47/283 |
| 2021/0297230 A1 | 9/2021 | Dror et al. |

FOREIGN PATENT DOCUMENTS

| | | |
|---|---|---|
| EP | 2254267 A1 | 11/2010 |
| EP | 3840255 A1 | 6/2021 |
| WO | 2012065823 A1 | 5/2012 |
| WO | 2013117997 A2 | 8/2013 |
| WO | 2016070947 A1 | 5/2016 |

\* cited by examiner

TIMESTAMPING FOR MULTIPLE SYNCHRONIZATION DOMAINS IN A NETWORK DEVICE

CROSS REFERENCES TO RELATED APPLICATIONS

This application claims the benefit of U.S. Provisional Patent App. No. 63/194,817, entitled "Time Synchronization Protocol in Industrial Networks," filed on May 28, 2021, the disclosure of which is hereby expressly incorporated herein by reference in its entirety.

FIELD OF TECHNOLOGY

The present disclosure relates generally to communication networks, and more particularly to timestamping packets in a network device with multiple synchronization domains.

BACKGROUND

Clock synchronization protocols are commonly used in packet-based networks to synchronize clocks maintained at different network devices. In such clock synchronization protocols, a first network device, which maintains a master clock, otherwise referred to herein as a source clock, transmits a timing packet including a transmit timestamp generated based on a source clock time to a second network device, which maintains a slave clock, otherwise referred to herein as an endpoint clock. The second network device utilizes the transmit timestamp of the timing packet and an estimated network latency to adjust the endpoint clock in order to synchronize the endpoint clock with the source clock.

Some network devices maintain multiple clocks for synchronization in multiple synchronization domains, such as a global time synchronization domain, a local network time synchronization domain, an operations, administration and maintenance (OAM) synchronization domain, etc. In such network devices, it is challenging to implement timestamping at network interfaces (e.g., ports) of the network device because multiple clocks, corresponding to the multiple synchronization domains, maintained by the network device typically need to be provided to each network interface of the network device. Providing multiple clocks to each network interface of the network device complicates internal communication mechanisms in the network device, for example by increasing the number of communication lines (e.g., communication bus widths) needed for distribution of clocks in the network device. Moreover, network interfaces with capabilities to perform timestamping in multiple synchronization domains in a network device are more complicated as compared to network interfaces that are configured to perform timestamping in only a single synchronization domain maintained by a network device. For example, a network interface of the network device with capabilities to perform timestamping in multiple synchronization domains needs to determine a synchronization domain of the packet and to select the appropriate clock to be used to generate a timestamp for the packet. Configuring network interfaces with such capabilities increases cost, power consumption, physical size, etc. of the network interfaces of the network device.

SUMMARY

In an embodiment, a method for processing timing packets for synchronizing network devices in a network device includes: receiving, at a packet processor of a network device, i) a packet received by a network interface of the network device and ii) a local-domain timestamp generated for the packet at the network interface of the network device based on a local-domain clock maintained by the network device; generating, by the packet processor, a domain-specific timestamp for the packet, the domain-specific timestamp for the packet generated based on a domain-specific clock maintained by the network device; determining, by the packet processor, a delay value using the local-domain clock maintained by the network device, the delay value accounting for a time delay experienced by the packet between a time at which the local-domain timestamp was generated at the network interface of the network device and a time, according to the local-domain clock, at which the domain-specific timestamp is generated by the packet processor of the network device; adjusting, by the packet processor, the domain-specific timestamp based on the delay value to generate an adjusted domain-specific timestamp for the packet; and performing, by the packet processor, at least one synchronization operation using the adjusted domain-specific timestamp generated for the packet.

In another embodiment, a network device comprises: a network interface implemented on one or more integrated circuits, the network interface configured to receive packets from a network link; and a packet processor implemented on the one or more integrated circuits, the packet processor configured to: receive i) a packet received by a network interface of the network device and ii) a local-domain timestamp generated for the packet at the network interface of the network device based on a local-domain clock maintained by the network device, generate a domain-specific timestamp for the packet, the domain-specific timestamp for the packet generated based on a domain-specific clock maintained by the network device, determine a delay value using the local-domain clock maintained by the network device, the delay value accounting for a delay experienced by the packet between a time at which the local-domain timestamp was generated at the network interface of the network device and a time, according to the local-domain clock, at which the domain-specific timestamp is generated by the packet processor of the network device, adjust the domain-specific timestamp based on the delay value to generate an adjusted domain-specific timestamp for the packet, and perform at least one synchronization operation using the adjusted domain specific timestamp generated for the packet.

In yet another embodiment, a method for timestamping packets in a network device comprises: generating, by a packet processor of the network device, a domain-specific timestamp for a packet to be transmitted via a network interface of the network device, the domain-specific timestamp generated using a domain-specific clock maintained by the network device; generating, by the packet processor, a local-domain timestamp for the packet, the local-domain timestamp generated based on a local-domain clock maintained by the network device; and providing the packet, the domain-specific timestamp and the local-domain timestamp to the network interface of the network device. The network interface is configured to determine a delay value using the local-domain clock maintained by the network device, the delay value accounting for a time delay experienced by the packet between generation of the domain-specific timestamp by the packet processor and a current time according to the local-domain clock, and transmit the packet, the domain-specific timestamp and the delay value to a second network device to allow the second network device to perform synchronization with the first network device in the synchronization domain.

In still another embodiment, a network device comprises a network interface implemented on one or more integrated circuits, the network interface configured to transmit packets via a network link; and a packet processor implemented on the one or more integrated circuits, the packet processor configured to: generate a domain-specific timestamp for a packet to be transmitted via a network interface of the network device, the domain-specific timestamp generated using a domain-specific clock maintained by the network device, generate a local-domain timestamp for the packet, the local-domain timestamp generated based on a local-domain clock maintained by the network device, and provide the packet, the domain-specific timestamp and the local-domain timestamp to the network interface. The network interface is configured to: determine a delay value using the local-domain clock maintained by the network device, the delay value accounting for a time delay between generation of the domain-specific timestamp by the packet processor for the packet and a current time according to the local-domain clock, and transmit the packet, the domain-specific timestamp and the delay value to a second network device to allow the second network device to perform synchronization with the first network device in the synchronization domain.

DETAILED DESCRIPTION

Figure 1:
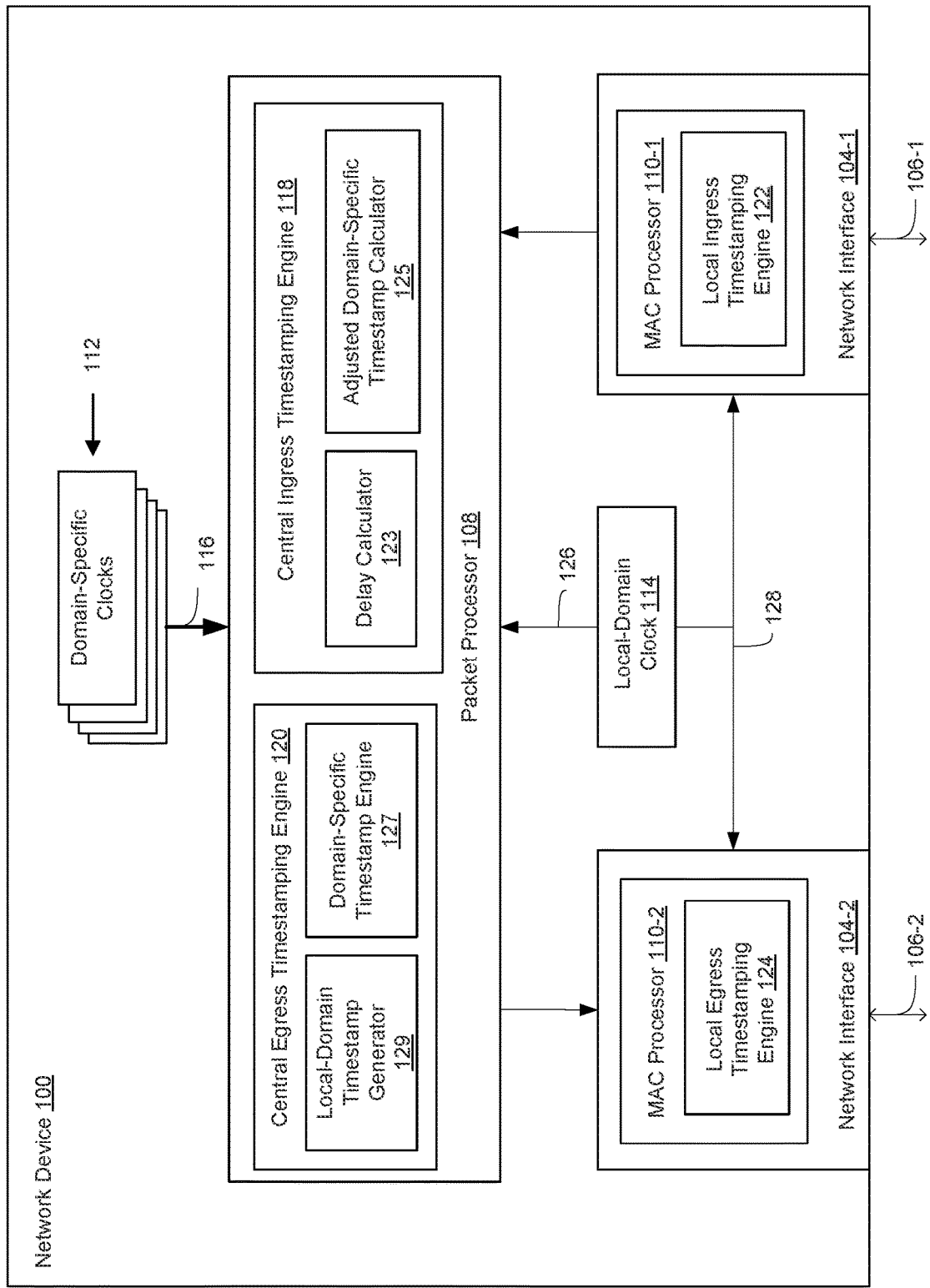
FIG. 1 is a block diagram of an example network device configured to perform timestamping of packets in multiple synchronization domains using a single local-domain clock at a network interface of the network device, according to an embodiment.

Timestamping of packets received by a network device or packets to be transmitted by a network device is generally performed as close as possible to the time of receipt of the packet by the network device or time of transmission of the packet by the network device. For example, in one-step timestamping performed by a network device, a synchronization packet transmitted by a source clock network device needs to include an egress timestamp generated as close as possible to the point of egress of the synchronization packet from the source clock network device, such as at a network interface via which the synchronization packet is egressed from the source clock network device, to allow an endpoint clock network device to accurately determine the time of transmission of the synchronization packet by the source clock network device. Similarly, an ingress timestamp for a synchronization packet received at an endpoint clock network device needs to be generated as close as possible to the point of ingress of the synchronization packet at the endpoint clock network device, such as at a network interface at which the synchronization is received by the endpoint clock network device. Thus, in a network device that is configured to perform synchronization in multiple synchronization domains (also sometimes referred to herein as time application interface (TAI) domains), multiple domain-specific clocks are typically supplied to each network interface of the network device to enable the network interfaces to generate timestamps for packets corresponding to respective ones of the multiple synchronization domains maintained in the network device. Further, in such typical network device, each network interface is configured to determine which domain-specific clock among the multiple domain-specific clocks is to be used for timestamping a packet as the packet is received or as the packet is being transmitted via the network interface of the network device, and to perform timestamping of the packet using the determined domain-specific clock. Providing multiple domain-specific clocks to the network interfaces of the network device increases internal communication demands in the network device. For example, wide communication busses are utilized to provide the multiple domain-specific clocks to the network interfaces of the network device. Further, requiring the network interfaces to perform domain-specific timestamping of packets increases the cost, size, power consumption, etc. of the network interfaces and, consequently, increases the cost, size, power consumption, etc. of the network device.

In embodiments described below, a network device is configured to perform timestamping of a packet using both a local-domain clock and a domain-specific clock maintained by the network device. The domain-specific clock is synchronized with a clock of another network device on a network, such as a network device that maintains a source clock for synchronization in the corresponding domain on the network, in an embodiment. The domain-specific clock is selected from among multiple domain-specific clocks maintained by the network device for synchronization in respective ones of multiple synchronization domains, in an embodiment. The local-domain clock, on the other hand, in a free-running clock that is not synchronized with any other clock, in an embodiment. As will be explained in more detail below, the local-domain clock is used to calculate internal delays experienced by packets transferred between timestamping engines within the network device, thereby facilitating use of a single local clock for timestamping packets at network interfaces of the network device while still performing synchronization in multiple synchronization domains, in an embodiment.

In an embodiment, timestamping using the domain-specific clock is performed by a central timestamping engine coupled to multiple network interfaces of the network device and configured to generate timestamps for packets received and/or to be transmitted via respective ones of the multiple network interfaces of the network device. On the other hand, timestamping using the local-domain clock is performed at the respective network interfaces of the network device as packets are received via the network interfaces or are being transmitted via the network interfaces of the network device. In embodiments, the local-domain clock is used by the network device to determine an internal delay experienced by a packet as the packet is transferred from the network interface to the central timestamping engine of the network device, or vice-versa. The network device is configured to use a determined internal delay for the packet to generate an adjusted domain-specific timestamp that captures a time that is at least substantially equal to the time of receipt of the packet at the network interface of the network device according to the domain-specific clock, in an embodiment. Similarly, for a packet being transmitted by a first network device to a second network device, the first network device embeds the delay value in the packet to allow the second network device to adjust a domain-specific timestamp included in the packet and to generate an adjusted domain-specific timestamp that captures a time that is at least substantially equal to the time of transmission of the packet from the network interface of the network device according to the domain-specific clock, in an embodiment. Thus, as will be described in more detail below, using both the local-domain clock and domain-specific clocks to timestamp packets allows the network device to accurately timestamp the packets with times that are at least substantially equal to the times of receipt of packets at network interfaces of the network device or transmission of packets from network interfaces of the network device without requiring the network interfaces to operate with multiple domain-specific clocks, thereby reducing internal communication demand and cost, size, power consumption, etc. of the network device, in at least some embodiments.

FIG. 1 is a block diagram of an example network device 100 configured to perform time synchronization in multiple synchronization domains, according to an embodiment. The network device 100 is configured to operate according to a synchronization protocol, such as the Institute of Electrical and Electronics Engineers (IEEE) 802.1AS time sensitive networking standard. In other embodiments, the network device 100 is configured to operate according to another synchronization protocols, such as the IEEE 1588 standard, commonly referred to as the "Precision Time Protocol" or "PTP," the network time protocol (NTP) or another suitable synchronization protocol. The network device 100 is configured to implement one-step timestamping, in an embodiment. In this embodiment, the network device 100 is configured to embed timing information corresponding to a transmission time of a timing packet directly into the timing packet, on-the-fly, as the timing packet is transmitted from the network device 100. In another embodiment, the network device 100 is configured to perform two-step timestamping where a transmission time of a timing packet is transmitted in a follow-up packet after transmission of the timing packet.

The network device 100 includes one or more network interfaces 104 configured to couple to respective one or more network links 106 for coupling the network device 100 to one or more other devices in a network. The network device 100 also includes a packet processor 108 coupled to the network interfaces 104. The network interfaces 104 are configured to receive packets via the network links 106 and to transfer the packets to the packet processor 108. The network interfaces 104 are also configured to receive packets from the packet processor 108, and to transmit the packets via the network links 106. The network interfaces 104 include one or more processors configured to operate a media access control (MAC) layer and/or physical (PHY) layer for transmission and reception of packets via the network links 106. For example, the network interfaces 104 include respective MAC processors 110 configured to control transmission and reception of packets via the network links 106, in an embodiment. Although the network device 100 is illustrated in FIG. 1 as having a MAC processor 110 included in each respective network interface 104, the network device 100 includes a MAC processor 110 that is coupled to multiple (e.g., all or a subset of all) network interfaces 104, in some embodiments. In another embodiment, the network device 100 is a single network interface device that includes only a single network interface 104 and only a single MAC processor 110.

The network device 100 is configured to operate as an ordinary clock device that implements a source clock or an endpoint clock on the network, a boundary clock device that synchronizes with a source clock and relays the source clock to one or more endpoint devices on the network, or relay or transparent clock that is an intermediate device configured to relay system residence time from a source to one or more salve devices on the network, in various embodiments. Generally, the network device 100 is configured to generate timing packets and/or update timing information in received timing packets, and to transmit the timing packets to one or more other network devices on the network to allow the one or more other network devices to synchronize with the source clock on the network, in various embodiments. The network device additionally or alternatively is configured to receive timing packets and to synchronize its own clocks based on timestamps in received timing packets. As used herein, the term "timing packets" refers to network data packets that include timestamps and/or other timing messages generated and transmitted by network devices in a network and used for conducting time related procedures in the network, such as clock synchronization between network devices in the network.

In an embodiment, the network device 100 is configured to maintain a plurality of domain-specific clocks 112 corresponding to multiple synchronization domains (also sometimes referred to herein as time application interface (TAI) domains). For example, the network device 100 is configured to maintain four domain-specific clocks 112, respective domain-specific clocks 112 corresponding to respective ones of four different synchronization domains. In other embodiments, the network device 100 is configured to maintain fewer than four (e.g., one, two or three) domain-specific clocks 112 or more than four (e.g., five, six, seven, etc.) domain-specific clocks 112. In an example embodiment, a first domain-specific clock 112 is a global clock used by the network device 100 for synchronization to a global source clock, a second domain-specific clock 112 is a network domain clock used by the network device 100 for synchronization to a network source clock within the network in which the network device 100 is operating, a third domain-specific clock 112 is an operations, administration and maintenance (OAM) clock used by the network device 100 for OAM clock synchronization, etc. In other embodiments, the domain-specific clocks 112 additionally or alternatively include clocks used by the network device 100 for synchronization in other suitable synchronization domains. The network device is also configured to maintain a local-domain clock 114, in an embodiment. The local-domain clock 114 is a free-running clock that is not synchronized to any other clock in any synchronization domain, in an embodiment.

In an embodiment, the network device 100 is configured to generate respective timing packets that include timestamps generated based on respective domain-specific clocks 112 maintained by the network device 100, to allow other network devices to synchronize to the respective domain-specific clocks in the respective synchronization domains. Similarly, in an embodiment, the network device 100 is configured to receive respective timing packets that include domain-specific timestamps generated for synchronization in respective synchronization domains, and to use the domain-specific timestamps for synchronization of the corresponding ones of the domain-specific clocks 112 maintained by the network device 100 for the respective synchronization domains.

In an embodiment, the packet processor 108 includes one or more central timestamping engines configured to generate domain-specific timing information for packets received by the network device 100 and/or packets to be transmitted by the network device 100. For example, the packet processor 108 includes a central ingress timestamping engine 118 configured to generate ingress domain-specific timestamps for packets received by the network device 100. The packet processor additionally or alternatively includes a central egress timestamping engine 120 configured to generate egress domain-specific timestamps for packets to be transmitted by the network device 100.

The network interfaces 104 include local timestamping engines configured to generate local timing information for packets received by the network device 100 and/or packets transmitted by the network device 100. For example, the network interface 104-1 includes a local ingress timestamping engine 122 configured to generate local timing information for packets ingressing the network device 100. The local ingress timestamping engine 122 is included in and implemented by the MAC processor 108-1 of the network interface 104-1, in an embodiment. Similarly, the network interface 104-2 includes a local egress timestamping engine 124 configured to generate local timing information for packets egressing the network device 100. The local egress timestamping engine 124 is included in and implemented by the MAC processor 108-2 of the network interface 104-2, in an embodiment. Although the MAC processor 108-1 is illustrated in FIG. 1 as including a local ingress timestamping engine 122, and the MAC processor 108-2 is illustrated in FIG. 1 as including a local egress timestamping engine 124, a MAC processor 108 includes both a local ingress timestamping engine 122 configured to generate local timing information for packets ingressing the network device 100 and a local egress timestamping engine 124 configured to generate local timing information for packets egressing the network device 100, in some embodiments.

The network interfaces 104 and the packet processor 108 are implemented using one or more integrated circuits (e.g., one or more application-specific integrated circuits (ASICs)), in an embodiment. In an embodiment, the packet processor 108 comprises a hardware pipeline processor, and the timestamping engines 118, 120 are pipeline elements of the pipeline processor. In another embodiment, the packet processor 108 comprises multiple processors configured to execute machine readable instructions stored in one or more memories (not shown), where the central timestamping engines 118, 120 are implemented by the multiple processors executing machine readable instructions.

Referring still to FIG. 1, the plurality of domain-specific clocks 112 maintained by the network device 100 are provided to the packet processor 108. The packet processor 108 is configured to perform various domain-specific timing operations using the domain-specific clocks 112, such as generating domain-specific timestamps using the domain-specific clocks 112, calculating adjustments to be applied to the domain-specific clocks 112 to synchronize the domain-specific clocks 112 to other domain-specific clocks in the corresponding synchronization domains, etc. The domain-specific clocks 112 are not provided to the network interfaces 104, in an embodiment. On the other hand, the local-domain clock 114 is provided to both the packet processor 108 and the network interfaces 104, in an embodiment. As will be explained in more detail below, the local-domain clock 114 is used to calculate a delay experienced by a timing packet in transit from the local ingress timestamping engine 122 at the ingress interface 104-1 to the central ingress timestamping engine 118, in an embodiment. As will also be explained in more detail below, the local-domain clock 114 is used to calculate a delay experienced by timing packet in transmit from the central egress timestamping engine 120 to the local egress timestamping engine 124, in an embodiment.

Figure 2:
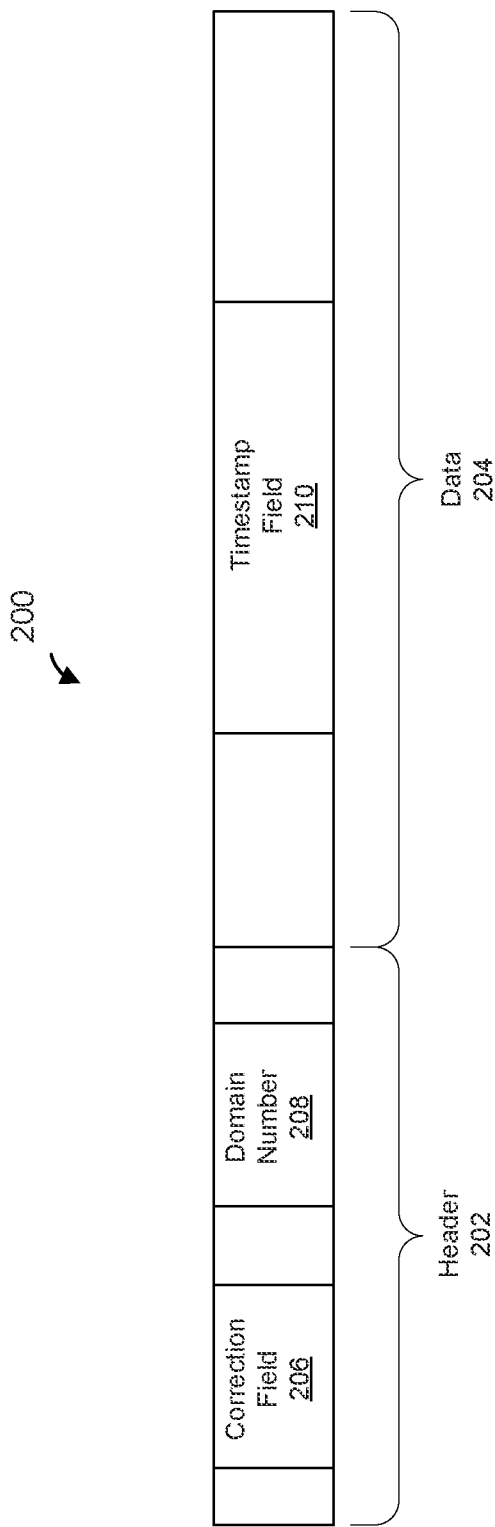
FIG. 2 is a diagram of a timing packet received or transmitted by the network device of FIG. 1, according to an embodiment.

Referring briefly to FIG. 2, an example timing packet 200 corresponds to a timing packet received by the network device 100 and/or a timing packet transmitted by the network device 100, in an embodiment. The timing packet 200 is a suitable timestamped data packet used for performing clock synchronization, in an embodiment. The timing packet 200 is a stand-alone timing packet or a timing packet that is included in another data packet, in various embodiments. The timing packet 200 includes a header 202 and a data portion 204. The header 202 includes a correction field 206, in an embodiment. The header 202 includes one or more other fields in addition to the correction field 206, in some embodiments. For example, the header 202 includes a domain number field 208 indicating a synchronization domain to which the timing packet 200 corresponds, in an embodiment. The data portion 204 includes a timestamp field 210. In some embodiments, the data portion 204 includes one or more fields in addition to the timestamp field 210. For example, the data portion 204 includes a checksum trailer field (not shown), such as a UDP trailer field or another type of checksum trailer field. The data portion 204 omits the checksum trailer field, in some embodiments.

Referring now FIGS. 1 and 2, in one embodiment and/or scenario, the timing packet 200 is a timing packet received by the network interface 104-1 via the network link 106-1. The timing packet 200 is a timestamped synchronization packet that includes a domain-specific timestamp in the timestamp field 210, in an embodiment. The timing packet 200 additionally includes an indication of the synchronization domain to which the timing packet 200 corresponds in the domain number field 208 in the header 202, in an embodiment. In an embodiment, when the timing packet 200 is received by the MAC processor 110-1 of the network interface 104-1, the local ingress timestamping engine 122 generates a local ingress timestamp for the packet based on the current value of the local-domain clock 114. The MAC processor 110-1 transfers the timing packet 200, along with the local ingress timestamp generated for the timing packet 200, to the packet processor 108. The central ingress timestamping engine 118 of the packet processor 108 is configured to determine the synchronization domain to which the timing packet 200 corresponds. For example, the central ingress timestamping engine 118 of the packet processor 108 is configured to determine the synchronization domain to which the timing packet 200 corresponds based on the domain number field 208 in the header 202 of the timing packet 200, in an embodiment. The central ingress timestamping engine 118 is further configured to generate an initial domain-specific timestamp for the timing packet 200 using the domain-specific clock 112 that corresponds to the synchronization domain of the timing packet 200.

Referring still to FIGS. 1 and 2, the central ingress timestamping engine 118 includes a delay calculator 123 configured to determine a delay experienced by the timing packet 200 in transit from the local ingress timestamping engine 122 of the network interface 104-1 to the central ingress timestamping engine 118 of the packet processor 108, in an embodiment. The delay calculator 123 is configured to determine the delay experienced by the timing packet 200 in transit from the local ingress timestamping engine 122 of the network interface 104-1 to the central ingress timestamping engine 118 of the packet processor 108 based on a difference between the local ingress timestamp generated for the timing packet 200 by the local ingress timestamping engine 122 and the current value of the local-domain clock 114 at the time when the timing packet 200 reaches the central ingress timestamping engine 118, in an embodiment. In an embodiment, the delay calculator 123 is configured to determine the delay by subtracting the local ingress timestamp generated for the timing packet 200 by the local ingress timestamping engine 122 from the current value of the local-domain clock 114 at the time when the timing packet 200 reaches the central ingress timestamping engine 118. The central ingress timestamping engine 118 also includes an adjusted domain-specific timestamp calculator 125, in an embodiment. The adjusted domain-specific timestamp calculator 125 is configured to generate an adjusted domain-specific timestamp for the timing packet 200 to account for the delay experienced by the packet in transit from the local ingress timestamping engine 122 of the network interface 104-1 to the central ingress timestamping engine 118 of the packet processor 108, in an embodiment. In an embodiment, the adjusted domain-specific timestamp calculator 125 is configured to generate the adjusted domain-specific timestamp by subtracting the delay from the initial domain-specific timestamp generated by the central ingress timestamping engine 118 for the packet. Thus, the adjusted domain-specific timestamp captures the time that is at least substantially equal to the time of receipt of the timing packet 200 by the network interface 104-1 according to the domain-specific clock 112 corresponding to the synchronization domain of the timing packet 200 without requiring the network interface 104-1 to determine the synchronization domain of the packet or to utilize the domain-specific clock 112 corresponding to the synchronization domain of the timing packet 200, in an embodiment.

In an embodiment, the packet processor 108 is configured to utilize the adjusted domain-specific timestamp to perform one or more synchronization operations for synchronizing the domain-specific clock 112 corresponding to the synchronization domain of the timing packet 200 with a source clock corresponding to the synchronization domain. In an embodiment, the packet processor 108 stores the adjusted domain-specific timestamp generated for the timing packet 200 in a memory and subsequently utilizes the adjusted domain-specific timestamp to adjust the domain-specific clock 112 for synchronization with the source clock corresponding to the synchronization domain, after determining a round-trip time between the network device 100 and a network device that maintains the source clock corresponding to the synchronization domain.

Referring still to FIGS. 1 and 2, in another embodiment or scenario, the timing packet 200 is a timing packet to be transmitted by the network interface 104-2 of the network device 100 via the network link 106-2. For example, in an embodiment, the timing packet 200 is a synchronization packet generated by the network device 100 for transmission to another network device on the network to allow the other network devices to synchronize a domain-specific clock maintained by the other network device with a corresponding domain-specific clock 112 maintained by the network device 100. In an embodiment, the central egress timestamping engine 120 of the packet processor 108 includes a domain-specific timestamp engine 127 configured to set the timestamp field 210 of the timing packet 200 to a current value of the domain-specific clock 112 maintained by the network device 100. The central egress timestamping engine 120 also includes a local-domain timestamp generator 129 configured to generate a local timestamp for the timing packet 200 based on the local-domain clock 114, in an embodiment. The packet processor 108 is configured to transfer the timing packet 200, along with the local timestamp generated by the central egress timestamping engine 120 for the timing packet 200, to the network interface 104-2, in an embodiment. The local egress timestamping engine 124 of the ingress interface 104-2 is configured to determine a delay experienced by the timing packet 200 in transit from the central egress timestamping engine 120 to the local egress timestamping engine 124 based on a difference between the local ingress timestamp generated for the timing packet 200 by the central egress timestamping engine 120 and the current value of the local-domain clock 114 at the time when the timing packet 200 reaches the local ingress timestamping engine 124. In an embodiment, the local egress timestamping engine 124 is configured to determine the delay by subtracting the local egress timestamp generated for the timing packet 200 by the central ingress timestamping engine 120 from the current value of the local-domain clock 114 at the time when the timing packet 200 reaches the local egress timestamping engine 124. The local egress timestamping engine 124 is configured to include the delay value in the timing packet 200, along with the value of the domain-specific clock 112 included in the timing packet 200 by the central egress timestamping engine 120, in an embodiment. For example, the local egress timestamping engine 124 is configured to embed the delay value into the correction field 206 of the timing packet 200, in an embodiment. The network interface 104-1 is configured to transmit the timing packet 200 with the domain-specific timestamp generated based on the domain-specific clock 112 capturing the time at which the network packet 200 was timestamped by the central egress timestamping engine 120 and the delay value capturing the delay experienced by the timing packet 200 from the time that the domain-specific timestamp is generated by the central egress timestamping engine 120 for the timing packet 200 and the time at least substantially equal to the time at which the timing packet 200 is being egressed from the network interface 104-2 of the network device 100 to allow a network device that receives the timing packet 200 to account for the delay experienced by the timing packet 200 in the network device 100, in an embodiment. Thus, the local egress timestamping engine 124 ensures that the egress time of the timing packet 200 according to the domain-specific clock 112 is accurately reflected in the timing packet 200 without requiring the network interface 104-2 to determine the synchronization domain of the timing packet 200 or to utilize the domain-specific clock 112 corresponding to the synchronization domain of the timing packet 200, in an embodiment.

With continued reference to FIG. 1, the domain-specific clocks 112 are maintained at the network device 100 using counters that are continually incremented and adjusted to maintain accurate clocks (e.g., time of day clocks) in the respective ones of the multiple synchronization domains maintained by the network device 100, in an embodiment. The local-domain clock 114 is a free running clock maintained at the network device 100 using a counter that is utilized only for determining the internal delays in the network device 100, in an embodiment. Thus, the counters utilized to maintain the domain-specific clocks 112 at the network device 100 are generally larger (e.g., have larger numbers of bits) as compared to the counter utilized to maintain the local-domain clock at the network device 100, in an embodiment. As a more specific example, the counters utilized to maintain the domain specific clocks 112 utilize 32 bits to maintain seconds and 48 bits to maintain nanoseconds of the domain-specific clocks 112. On the other hand, the counter utilized to maintain to local-domain clock 114 utilizes only 1 or 2 bits to maintain seconds and 30 bits to maintain nanoseconds of the local-domain clock, in an embodiment. Accordingly, interfaces, such as communication buses 116, configured to provide the domain-specific clocks 112 to the packet processor 108 are generally larger (e.g., wider busses, having more communication lines) as compared to generally smaller (e.g., narrower busses having fewer communication lines) interfaces, such as communication busses 126, 128, configured to provide the local-domain clock 114 to, respectively, the packet processor 108 and the network interfaces 104, in an embodiment. Thus, because the larger interfaces needed for the domain-specific clocks 112 are only needed to provide the domain-specific clocks 112 to the packet processor 108 and not to the multiple network interfaces 104, internal communication demands are reduced in the network device 100.

Referring still to FIG. 1, it is noted that although the network device 100 is illustrated in FIG. 1 as including only two network interfaces 104 and two MAC processors 110 coupled to the packet processor 108, the network device 100 generally includes more than two network interfaces 104 and more than two MAC processors 110 coupled to the packet processor 108 in various embodiments. For example, the network device 100 generally tens or even hundreds of network interfaces 104 and MAC processors 110 coupled to the packet processor 108 in some embodiments. Because the network interfaces 104 and the MAC processors 110 are configured to perform timestamping of packets in multiple synchronization domains using only the local-domain clock 114 and without using the domain-specific clocks 112, the design of the network interface device 100 is greatly simplified and the cost, size, power consumption, etc. of the network interface 100 is greatly reduced, in various embodiments.

Figure 3:
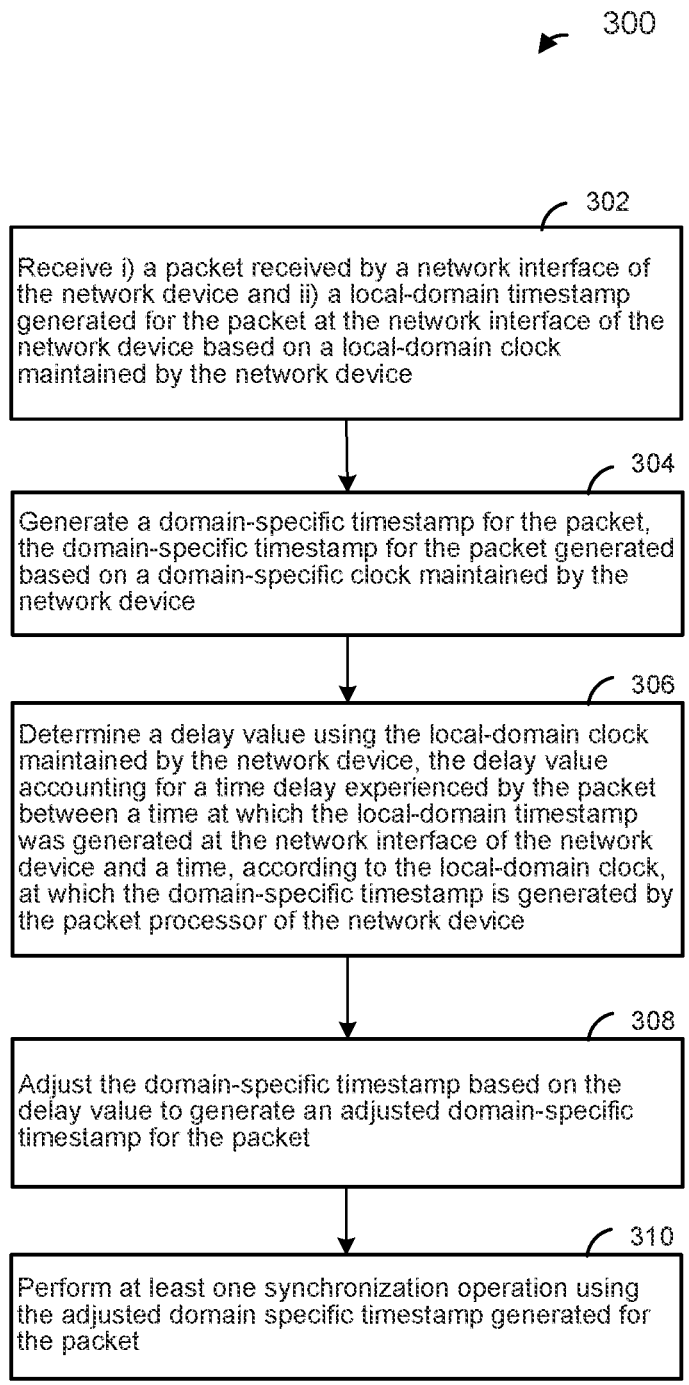
FIG. 3 is a flow diagram illustrating an example method for processing timing packets for synchronizing network devices in a network device, according to an embodiment.

FIG. 3 is a flow diagram illustrating an example method 300 for processing timing packets for synchronizing network devices in a network device, according to an embodiment. In an embodiment, the network device 100 of FIG. 1 implements the method 300. For example, in an embodiment, the packet processor 108 of the network device 100 implements the method 300. For ease of explanation, the method 300 is described with reference to the network device 100 of FIG. 1. In other embodiments, the method 300 is implemented by other suitable network devices.

At block 302, a packet processor of a network device receives i) a packet received by a network interface of the network device and ii) a local-domain timestamp generated for the packet at the network interface of the network device based on a local-domain clock maintained by the network device. In an embodiment, the local-domain timestamp is generated based on a local-domain clock maintained by the network device. For example, the packet processor 108 receives the timing packet 200 of FIG. 2 received via the network interface 104-1 of the network device 100 and a local-domain timestamp is generated by the local ingress timestamping engine 122 included in the network interface 104-1 (e.g., included in the MAC processor 110-1) of the network device 100, in an embodiment. In another embodiment, the packet processor that receives the packet at block 302 is different from the packet processor 108 and/or the packet received by the packet processor at block 302 is different from the timing packet 200.

At block 304, by the packet processor generates a domain-specific timestamp for the packet. The domain-specific timestamp for the packet is generated based on a domain-specific clock maintained by the network device. In an embodiment, generating the domain-specific timestamp at block 304 includes determining the synchronization domain to which the packet corresponds, and selecting the appropriate domain-specific clock 112 to be used by the packet processor 108 to generate the domain-specific timestamp for the packet.

At block 306, the packet processor determines a delay experienced by the packet between a time at which the local-domain timestamp was generated at the network interface of the network device and a time, according to the local-domain clock, at which the domain-specific timestamp is generated by the packet processor of the network device. For example, in an embodiment, the central ingress timestamping engine 118 (e.g., the delay calculator 123) of the packet processor 108 determines the experienced by the packet. The packet processor determines the delay based on a difference between the local ingress timestamp generated for the timing packet 200 by the local ingress timestamping engine 122 and the current value of the local-domain clock 114 at the time when the timing packet 200 reaches the central ingress timestamping engine 118, in an embodiment.

At block 308, the packet processor generates an adjusted domain-specific timestamp for the packet based on the delay experienced by the packet between a time when the packet is received by the network device and the time the domain-specific timestamp is generated by the packet processor of the network device. For example, in an embodiment, the central ingress timestamping engine 118 (e.g., the adjusted domain-specific timestamp calculator 125) of the packet processor 108 determines the adjusted domain-specific timestamp for the packet. In an embodiment, the packet processor generates the adjusted domain-specific timestamp by subtracting the delay value determined at block 306 from the initial domain-specific timestamp generated for the packet at block 304. Thus, the adjusted domain-specific timestamp captures a time that is at least substantially equal to the time of receipt of the timing packet by a network interface of the network device according to the domain-specific clock corresponding to the synchronization domain of the timing packet without requiring the network interface of the network device to determine the synchronization domain of the packet or to utilize the domain-specific clock corresponding to the synchronization domain of the timing packet.

At block 310, by the packet processor performs at least one synchronization operation using the adjusted domain-specific timestamp generated for the packet. In an embodiment, the packet processor stores the adjusted domain-specific timestamp in a memory to be subsequently used for synchronizing the domain-specific clock corresponding to the synchronization domain of the packet. Thus, in an embodiment, the domain-specific clock is synchronized by the network device without requiring the domain-specific timestamping to be performed at the network interface via which the packet is received by the network device.

Figure 4:
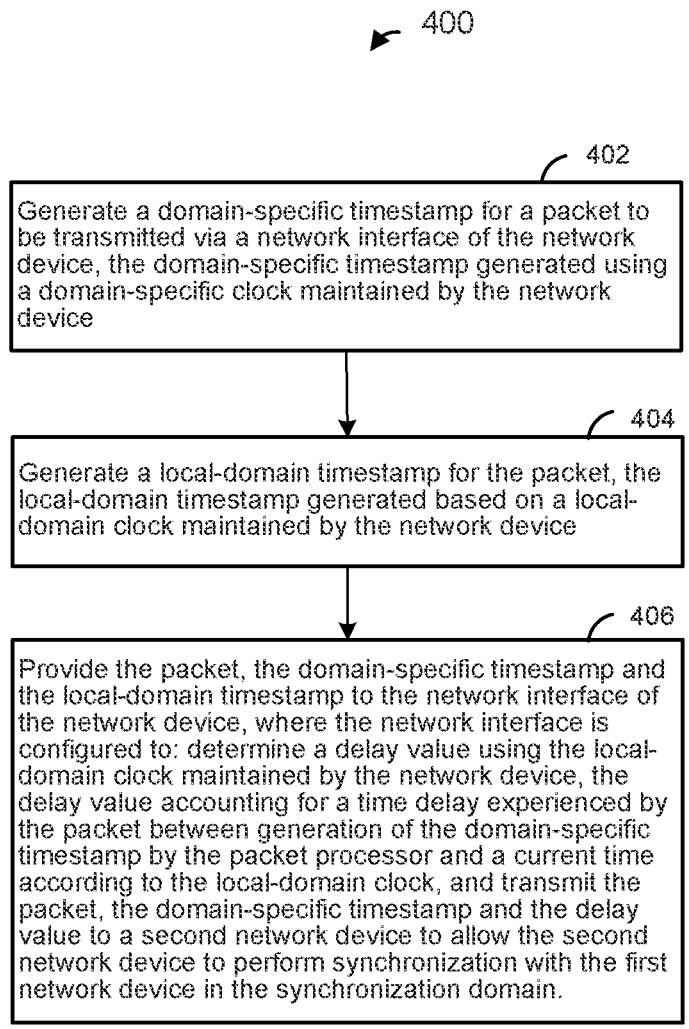
FIG. 4 is a flow diagram illustrating an example method for timestamping packets in a network device, according to an embodiment.

FIG. 4 is a flow diagram illustrating an example method 400 for timestamping packets in a network device, according to an embodiment. In an embodiment, the network device 100 of FIG. 1 implements the method 400. For example, in an embodiment, the packet processor 108 of the network device 100 implements the method 400. For ease of explanation, the method 400 is described with reference to the network device 100 of FIG. 1. In other embodiments, the method 400 is implemented by other suitable network devices.

At block 402, a packet processor of the network device generates a domain-specific timestamp for a packet to be transmitted via a network interface of the network device. For example, in an embodiment, the central egress timestamping engine 120 (e.g., the domain-specific timestamp engine 127) of the packet processor 108 device generates the domain-specific timestamp for the packet. In an embodiment, the packet processor generates the domain-specific timestamp for the timing packet 200 of FIG. 2 to be transmitted by the network device. In an embodiment, the domain-specific timestamp is generated at block 402 using a domain-specific clock maintained by the network device. For example, the domain-specific timestamp is generated based on a domain-specific clock 112 corresponding to the synchronization domain of the packet.

At block 404, the packet processor generates a local-domain timestamp for the packet to be transmitted via the network interface of the network device. For example, in an embodiment, the central egress timestamping engine 120 (e.g., the local-domain timestamp generator 129) of the packet processor 108 device generates the local-domain timestamp for the packet. In an embodiment, the local-domain timestamp is generated by the packet processor based on a local-domain clock maintained by the network device. For example, the domain-specific timestamp is generated based on the local-domain clock 114 maintained by the network device.

At block 406, the packet processor provides the packet, the domain-specific timestamp generated for the packet at block 402 and the local-domain timestamp generated for the packet at block 404 to the network interface via which the packet is to be transmitted from the network device. In an embodiment, the network interface is configured to determine, based on the local-domain timestamp generated for the packet at block 404 and a current value of the local-domain clock, a delay value capturing a time delay between the time that the domain-specific timestamp was generated by the packet processor for the packet and a time of transmission of the packet from the network device. The network interface is configured to transmit the packet, the domain-specific timestamp and the delay value to a second network device to allow the second network device to perform synchronization with the first network device in the particular synchronization domain, in an embodiment. For example, the network interface is configured to embed the delay value into a correction field of the packet, in an embodiment. By embedding the delay value in the packet, the network interface ensures that the egress time of the packet from the network device according to the domain-specific clock corresponding to the synchronization domain of the packet is accurately reflected in the packet without requiring the network interface to determine the synchronization domain of the packet or to utilize the domain-specific clock corresponding to the synchronization domain of the packet, in an embodiment.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for processing timing packets for synchronizing network devices in a network device, the method comprising:
    receiving, at a packet processor of a network device, i) a packet received by a network interface of the network device and ii) a local-domain timestamp generated for the packet at the network interface of the network device based on a local-domain clock maintained by the network device;
    generating, by the packet processor, a domain-specific timestamp for the packet, the domain-specific timestamp for the packet generated based on a domain-specific clock maintained by the network device;
    determining, by the packet processor, a delay value using the local-domain clock maintained by the network device, the delay value accounting for a time delay experienced by the packet between a time at which the local-domain timestamp was generated at the network interface of the network device and a time, according to the local-domain clock, at which the domain-specific timestamp is generated by the packet processor of the network device;
    adjusting, by the packet processor, the domain-specific timestamp based on the delay value to generate an adjusted domain-specific timestamp for the packet; and
    performing, by the packet processor, at least one synchronization operation using the adjusted domain-specific timestamp generated for the packet.

2. The method of claim 1, wherein generating the domain-specific timestamp for the packet includes
    determining a synchronization domain to which the packet corresponds, and
    selecting, based on the synchronization domain to which the packet corresponds, the domain-specific clock from among a plurality of domain-specific clocks maintained by the network device, respective ones of the domain-specific clocks, among the plurality of domain-specific clocks, corresponding to different synchronization domains maintained by the network device, and
    generating the domain-specific timestamp using the selected domain-specific clock.

3. The method of claim 1, wherein determining the delay value comprises subtracting the local-domain timestamp generated by the network interface based on the local-domain clock from a current value of the local-domain clock.

4. The method of claim 1, wherein adjusting the domain-specific timestamp based on the delay value to generate the adjusted domain-specific timestamp for the packet comprises subtracting the delay value from a current value of the domain-specific clock.

5. The method of claim 1, wherein performing at least one synchronization operation using the adjusted domain-specific timestamp generated for the packet comprises synchronizing the domain-specific clock using the adjusted domain-specific timestamp generated for the packet.

6. A network device, comprising:
a network interface implemented on one or more integrated circuits, the network interface configured to receive packets from a network link;
and a packet processor implemented on the one or more integrated circuits, the packet processor configured to:
receive i) a packet received by a network interface of the network device and ii) a local-domain timestamp generated for the packet at the network interface of the network device based on a local-domain clock maintained by the network device,
generate a domain-specific timestamp for the packet, the domain-specific timestamp for the packet generated based on a domain-specific clock maintained by the network device,
determine a delay value using the local-domain clock maintained by the network device, the delay value accounting for a delay experienced by the packet between a time at which the local-domain timestamp was generated at the network interface of the network device and a time, according to the local-domain clock, at which the domain-specific timestamp is generated by the packet processor of the network device,
adjust the domain-specific timestamp based on the delay value to generate an adjusted domain-specific timestamp for the packet, and
perform at least one synchronization operation using the adjusted domain specific timestamp generated for the packet.

7. The network device of claim 6, wherein the packet processor is configured to:
determine a synchronization domain to which the packet corresponds,
select, based on the synchronization domain to which the packet corresponds, the domain-specific clock from among a plurality of domain-specific clocks maintained by the network device, respective ones of the domain-specific clocks, among the plurality of domain-specific clocks, corresponding to different synchronization time domains maintained by the network device, and
generate the domain-specific timestamp using the selected domain-specific clock.

8. The network device of claim 6, wherein the packet processor is configured to determine the delay value at least by subtracting the local-domain timestamp generated by the network interface based on the local-domain clock from a current value of the local-domain clock.

9. The network device of claim 6, wherein the packet processor is configured to adjust the domain-specific timestamp based on the delay value to generate an adjusted domain-specific timestamp for the packet at least by subtracting the delay value from a current value of the domain-specific clock.

10. The network device of claim 6, wherein the packet processor is configured to adjust the domain-specific clock using the adjusted domain-specific timestamp generated for the packet.

11. A method for timestamping packets in a network device, the method comprising:
generating, by a packet processor of the network device, a domain-specific timestamp for a packet to be transmitted via a network interface of the network device, the domain-specific timestamp generated using a domain-specific clock maintained by the network device;
generating, by the packet processor, a local-domain timestamp for the packet, the local-domain timestamp generated based on a local-domain clock maintained by the network device; and
providing the packet, the domain-specific timestamp and the local-domain timestamp to the network interface of the network device, wherein the network interface is configured to:
determine a delay value using the local-domain clock maintained by the network device, the delay value accounting for a time delay experienced by the packet between generation of the domain-specific timestamp by the packet processor and a current time according to the local-domain clock, and
transmit the packet, the domain-specific timestamp and the delay value to a second network device to allow the second network device to perform synchronization with the first network device in the synchronization domain.

12. The method of claim 11, wherein generating the domain-specific timestamp for the packet includes selecting, based on a synchronization domain of the packet, the domain-specific clock from among a plurality of domain-specific clocks maintained by the network device, respective ones of the domain-specific clocks corresponding to different synchronization domains maintains maintained by the network device.

13. The method of claim 11, wherein the network interface is configured to determine the delay value based on a difference between the local-domain timestamp generated by the packet processor and a current value of the local-domain clock at the network interface.

14. The method of claim 11, wherein
the packet processor is configured to include the domain-specific timestamp in a first field of the packet prior to providing the packet to the network interface, and
the network interface is configured to embed the delay value into a second field in the packet as the packet is being transmitted by the network device.

15. The method of claim 14, wherein the network interface is configured to embed the delay value into a correction field in a header of the packet as the packet is being transmitted by the network device.

16. A network device, comprising:
a network interface implemented on one or more integrated circuits, the network interface configured to transmit packets via a network link;
and a packet processor implemented on the one or more integrated circuits, the packet processor configured to:
generate a domain-specific timestamp for a packet to be transmitted via a network interface of the network device, the domain-specific timestamp generated using a domain-specific clock maintained by the network device,
generate a local-domain timestamp for the packet, the local-domain timestamp generated based on a local-domain clock maintained by the network device, and
provide the packet, the domain-specific timestamp and the local-domain timestamp to the network interface, and wherein
the network interface is configured to:
determine a delay value using the local-domain clock maintained by the network device, the delay value accounting for a time delay between generation of the domain-specific timestamp by the packet processor for the packet and a current time according to the local-domain clock, and transmit the packet, the domain-specific timestamp and the delay value to a second network device to allow the second network device to perform synchronization with the first network device in the synchronization domain.

17. The network device of claim 16, wherein the packet processor is configured to select, based on a synchronization domain of the packet, the domain-specific clock from among a plurality of domain-specific clocks maintained by the network device, respective ones of the domain-specific clocks corresponding to different synchronization domains maintains maintained by the network device.

18. The network device of claim 16, wherein the network interface is configured to determine the delay value based on a difference between the local-domain timestamp generated by the packet processor and a current value of the local-domain clock at the network interface.

19. The network device of claim 16, wherein:

the packet processor is configured to include the domain-specific timestamp in a first field of the packet prior to providing the packet to the network interface, and the network interface is configured to embed the delay value into a second field in the packet as the packet is being transmitted by the network device.

20. The network device of claim 19, wherein the network interface is configured to embed the delay value into a correction field in a header of the packet as the packet is being transmitted by the network device.

* * * * *